United States Patent [19]

Asano et al.

[11] Patent Number: 5,151,240
[45] Date of Patent: Sep. 29, 1992

[54] LEATHER-LIKE MATERIAL HAVING EXCELLENT WATER VAPOR PERMEABILITY AND SUPPLENESS AND ITS MANUFACTURE

[75] Inventors: Koin Asano, Takatsuki; Kenichi Tagawa, Hofu; Hiroshi Nakagawa, Hofu; Hiroyuki Wakahara, Hofu, all of Japan

[73] Assignee: Kanebo, Ltd., Tokyo, Japan

[21] Appl. No.: 410,701

[22] Filed: Sep. 21, 1989

[30] Foreign Application Priority Data

Sep. 6, 1989 [JP] Japan .................................. 1-229372

[51] Int. Cl.$^5$ .............................................. B29C 41/00
[52] U.S. Cl. ........................................ 264/284; 156/209;
156/219; 156/220; 156/231; 156/324; 264/45.8;
427/246; 427/277; 428/904
[58] Field of Search ............... 156/209, 219, 220, 324,
156/231; 428/904; 427/246, 277; 264/284, 45.8

[56] References Cited

U.S. PATENT DOCUMENTS

| | | |
|---|---|---|
| 3,067,482 | 12/1962 | Hollowell . |
| 3,536,553 | 10/1970 | Farrell et al. .................... 427/246 X |
| 3,668,054 | 6/1972 | Stumpf ............................. 428/473 X |
| 3,764,363 | 10/1973 | Civardi et al. ..................... 264/41 X |
| 4,028,161 | 6/1977 | Fukushima et al. ................ 156/153 |
| 4,557,778 | 12/1985 | Held ................................... 156/324 X |
| 4,731,143 | 3/1988 | Cross ................................. 156/231 |

FOREIGN PATENT DOCUMENTS 37-4434 6/1962 Japan .
47-48506 12/1973 Japan .
2107644 5/1983 United Kingdom .

*Primary Examiner*—David A. Simmons
*Assistant Examiner*—Merrick Dixon
*Attorney, Agent, or Firm*—Flynn, Thiel, Boutell & Tanis

[57] ABSTRACT

A leather-like material having a soft feed and a high water vapor permeability comprises a substrate of a fiber aggregate and a microporous grain layer mainly comprising a polyurethane elastomer and having an average thickness between 20 μm and 300 μm, preferably between 20 μm and 200 μm, more preferably 20 μm and 100 μm. The grain layer has an inner layer portion permeating partly into interstices of the fiber aggregate and bonding thereto, a topside having been coagulated to set up with a flat and smooth, or animal skin-like, grain appearance and micropores having an average pore diameter gradient of from at least 4 μm in the inner layer portion to at most 3 μm in the surface layer portion. The leather-like material is characterized by a water vapor permeability of from 1 to 30 mg/cm$^2$.hr and a Gurley stiffness ratio of article to substrate of at most 1.5. The leather-like material of the invention is manufactured by a process comprising the steps in sequence of: coating a release belt with a water-miscible solvent solution of a polyurethane elastomer; superimposing a water-moisturized substrate on the coated solution; heating the topside surface of the substrate to coagulate said polyurethane elastomer by the action of saturated water vapor forming within the substrate; and then releasing the resultant leather-like material from the release belt, followed by washing with water and drying.

6 Claims, 3 Drawing Sheets

FIG_2
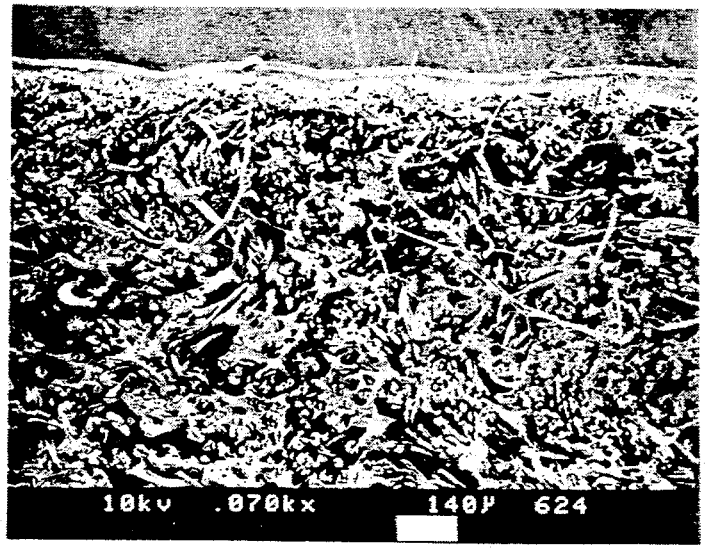
x70
FIG_3
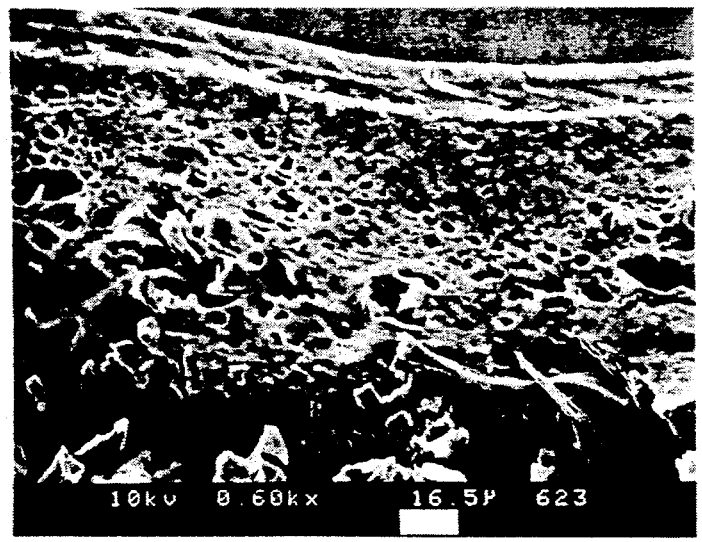
x600

FIG_4
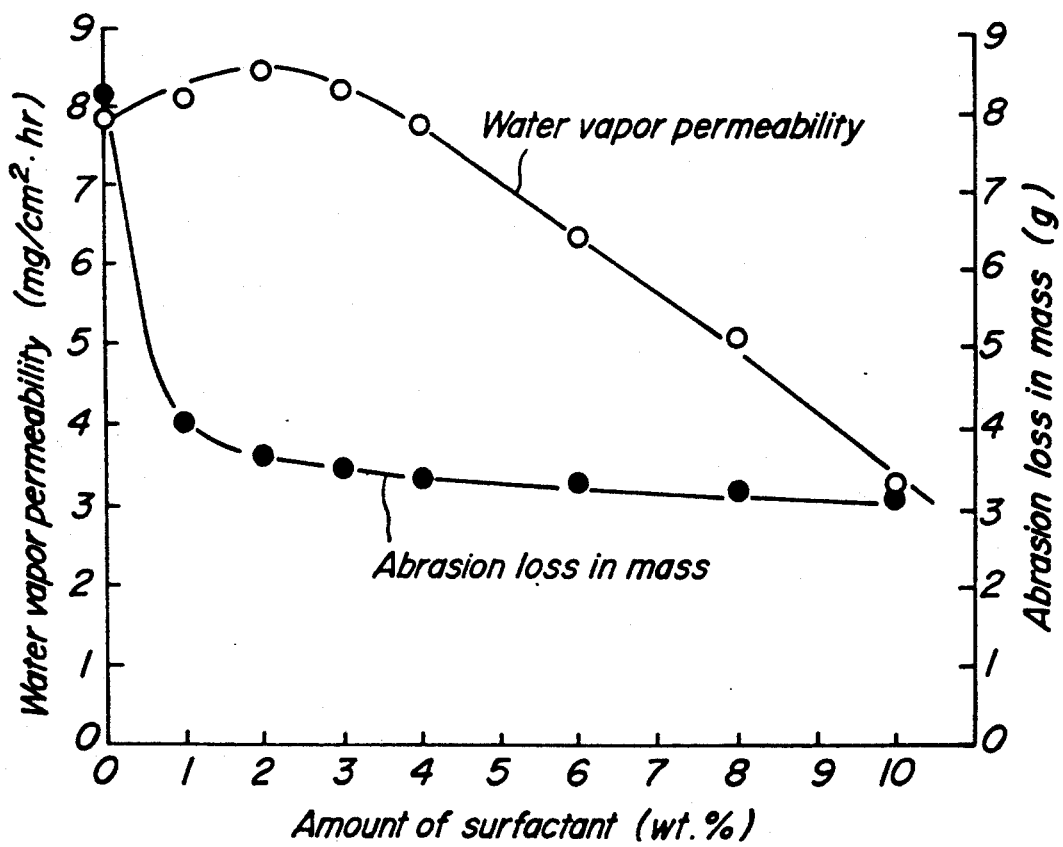

LEATHER-LIKE MATERIAL HAVING EXCELLENT WATER VAPOR PERMEABILITY AND SUPPLENESS AND ITS MANUFACTURE

BACKGROUND OF THE INVENTION

1. Field of the Invention

The present invention relates to leather-like materials having a soft feel and an excellent water vapor permeability and comprising a grain layer, particularly, a thin, microporous grain layer, having an animal skin-like grain appearance. This invention also relates to processes for manufacturing these leather-like materials by utilizing the so-called "wet regeneration process".

2. Description of the Prior Art

As a leather-like material, those of light weight having a soft feel have so far been desired. Therefore, leather-like materials of light weight which have as thin a grain layer as possible have been most extensively used. Such leather-like materials are manufactured generally according to the so-called "dry, release paper process" wherein a grain patterned release paper is coated with a resinous material solution for a grain layer and then the resulting resinous film imparted with a grain appearance is transferred onto a leather substrate, followed by drying. However, this process produces nonporous grain layers and, therefore, it can not help from sacrificing desirable functions, such as water vapor permeability.

On the other hand, there has been widely used the so-called "wet process" wherein a substrate comprising a fiber aggregate, such as woven fabrics, nonwoven fabrics, knitted goods or the like, which has been pre-finished with a binder, is coated with a resinous material solution for a grain layer and then a grain layer is formed by means of wet regeneration. According to this process, though microporous grain layers can be obtained, the thickness of the grain layers must be increased (in most cases, up to 300~500 μm) so that the grain layers can cover up recesses and projections on the substrate, such as the texture of woven or knitted fabrics, fluffs of nonwoven fabrics, binders or the like. Therefore, the feel of the products inevitably becomes hard and stiff. Moreover, re-dissolution and re-coagulation of the binder in the substrate, due to the coated grain layer resinous material solution, extremely enhance hardening and stiffening, so that its use has had to be limited.

In order to produce leather-like materials having excellent suppleness, water vapor permeability and surface appearance by providing a substrate with a very thin and flat microporous grain layer, particularly 300 μm thick or less, preferably 200 μm or less, many attempts to improve the coating means, such as doctor coating, reverse roll coating, gravure coating, spray coating or the like, heretofore have been made. However, even though grain layers more than about 300 μm thick could be produced by any means, such an extremely thin layer as desired by the present invention has been almost impossible to manufacture by only improving these coating means. One of the primary technical reasons for difficulties encountered in the manufacture of a smooth and flat surface, thin microporous grain layer according to the conventional processes is that resinous materials for the grain layers contain a solvent in an amount of not less than 70~85% by weight which diffuses into water to greatly reduce the thickness when the grain layer resinous materials coagulate to set up, so that the recesses and projections on the surface of the substrate are emphasized to produce a rough surface. As a process aiming to eliminate these technical drawbacks, there have been proposed water vapor coagulation processes as disclosed in, for example, Japanese patent application Publication Nos. 4,434/1962 and 48,506/1972. These processes are techniques to obtain porous grain layers by contacting the surface of the coated grain layer solution directly with water vapor to coagulate the solution while being maintained as a flat, horizontal plane. According to these processes, since a relatively large quantity of grain layer resinous material solution is coated, smoothness can be readily obtained by virtue of the principle of the horizontal liquid plane. However, the thickness of the resulting grain layer is generally from more than 300 to 500 μm and, as described hereinbefore, stabilized, thin grain layers 300 μm thick or less, preferably 200 μm thick or less, have not been able to be obtained. Besides, the grain layers according to these processes have pores of a relatively large diameter formed in the vicinity of the surface, so that the surface structure materially collapses during the embossing step, causing a problem in abrasion resistance.

As described above, leather-like materials which are excellent in both water vapor permeability and suppleness, and comprise a thin, microporous grain layer having a smooth appearance have been strongly desired in the market, whereas such products have not appeared as yet.

Alternatively, leather-like materials having a grain layer of a smooth surface, in most cases, are further subjected to a conventional embossing process to increase their commercial value, whereby it cannot be denied that the grain layer of the microporous structure has collapsed due to the heat and pressure applied during embossing so that the suppleness thereof is impaired.

Accordingly, leather-like materials which have excellent water vapor permeability and suppleness, and comprise a thin, microporous grain layer with a desired clear animal skin-like grain appearance, without impairing these excellent properties, have also been desired to be brought into the market.

SUMMARY OF THE INVENTION

As a result of the further pursuit of the above-described water vapor coagulation process, we, the inventors, have succeeded in solving the aforementioned problems and providing leather-like materials with excellent characteristics and which are expected to be put to diversified applications, and thus accomplished the present invention.

An object of the present invention is to provide extremely supple and highly water vapor permeable leather-like materials comprising a grain layer having a smooth surface appearance.

Another object is to provide extremely supple and highly water vapor permeable leather-like materials comprising a grain layer having a desired clear animal skin-like grain appearance and a microporous structure that does not collapse from the surface to the inside of the grain layer.

A further object is to provide such leather-like materials by a rational process, at a low cost and, advantageously, on a commercial scale.

The above objects of the present invention are attained by a leather-like material which is characterized by being composed of a substrate comprising a fiber aggregate as a skeleton and a microporous grain layer mainly comprising a polyurethane elastomer and having an average thickness between 20 μm and 300 μm, The grain layer is superimposed onto one surface of the substrate in such a fashion that the inner layer portion of the grain layer permeates partly into interstices of the fiber aggregate and is bonded to fibers in the adjoining surface layer of the substrate. The grain layer has a topside surface coagulated to set a grain appearance thereon and micropores dispersed therein. The micropores have an average pore diameter gradually decreasing from at least 4 μm in the inner layer portion to at most 3 μm in the surface layer portion. The leather-like material is further characterized by a water vapor permeability of from 1 to 30 mg/cm$^2$·hr and a Gurley stiffness ratio of article to substrate of at most 1.5.

In one embodiment of the invention, the grain layer has a topside surface coagulated to set up with a smooth and flat appearance.

In another embodiment of the invention, the grain layer has a topside surface coagulated to set up with a desired clear animal skin-like grain appearance.

In a preferable embodiment of the invention, the water vapor permeability is from 3 to 20 mg/cm$^2$·hr and said Gurley stiffness ratio of article to substrate is at most 1.3.

In a more preferable embodiment, the grain layer has an average thickness between 20 μm and 100 μm and a grain layer peel strength of at least 2 Kg/cm.

The leather-like material of the present invention is obtained by a process comprising the steps in sequence of: coating a release belt with a water-miscible solvent solution mainly comprising a polyurethane elastomer; superimposing a water-moisturized substrate on the coated solution; heating the topside surface of the substrate to substantially coagulate said polyurethane elastomer by the action of saturated water vapor forming within the substrate; and then releasing the resultant leather-like material from the release belt, followed by washing the material with water and drying it.

To provide a grain layer having a topside surface coagulated to set up with a smooth and flat appearance, the release belt employed in the above process should have a flat and smooth surface.

Alternatively, to provide a grain layer having a topside surface coagulated to set up with a desired clear animal skin-like grain appearance, the release belt employed in the above process has an inverse pattern of the desired grain appearance.

In the above process of the invention, the water-moisturized substrate has a water add-on amount of preferably 30~150%, more preferably 50~120%, based on the weight of the substrate.

Further, in the above process of the invention, the water-miscible solvent solution mainly containing a polyurethane elastomer is preferred to also contain a surface active agent in an amount of 0.5~8%, preferably 1~4%, based on the weight of the polyurethane solids content.

Further, throughout this specification, the term "Gurley stiffness ratio of article to substrate" means the ratio of a Gurley stiffness of the leather-like material consisting of a substrate and a grain layer to the Gurley stiffness of the substrate alone contained in the same leather-like material, which Gurley stiffnesses are determined in accordance with JIS L-1096.

BRIEF DESCRIPTION OF THE DRAWINGS

The present invention will be further explained in more detail hereinafter by way of example, with reference to the appended drawings, wherein:

FIG. 2 is a photomicrograph of a cross-section of a leather-like material according to the present invention;

FIG. 3 is a further enlarged photomicrograph of a part of the cross-section shown in FIG. 2; and FIG. 4 is a graph showing interrelations of the amount of surfactant with water vapor permeability and with abrasion percentage.

DETAILED DESCRIPTION OF THE INVENTION

Figure 1:
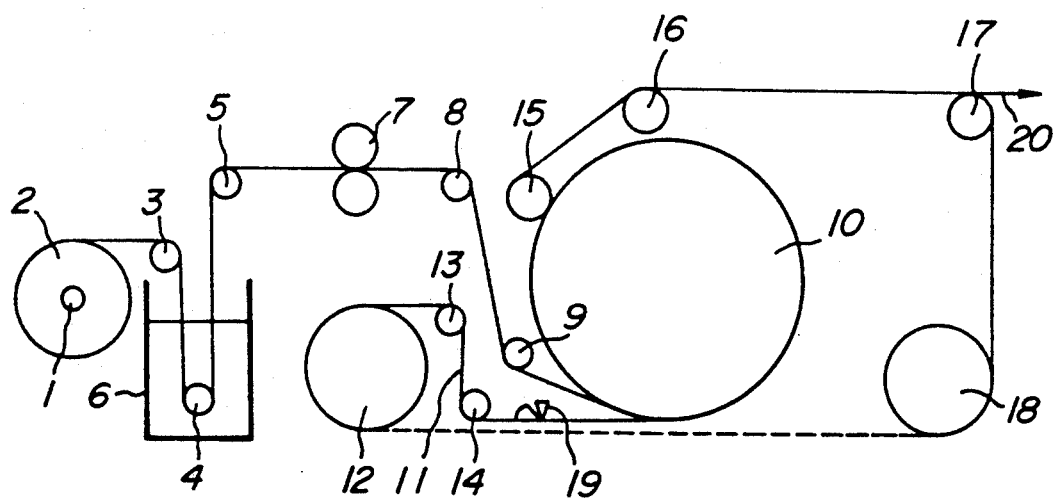
FIG. 1 is a schematic side elevational view illustrating an embodiment of an apparatus for manufacturing the leather-like materials of the present invention.

The substrate to be employed in the present invention is a sheet material comprising a synthetic or natural fiber aggregate, as a skeleton, such as woven fabrics, nonwoven fabrics, knitted goods, raised fabrics thereof, or the like, or a fiber aggregate finished with a binder. Usually employed fibers are those readily available commercially, such as cotton, viscose staples, rayon, nylon, polyester fibers, or the like. The preferable density of the substrate lies between 0.15 g/cm$^2$ and 0.50 g/cm$^2$, more preferably between 0.25 g/cm$^2$ and 0.45 g/cm$^2$.

As a binder, those most suitably employed are high polymeric elastomers, such as polyacrylates, polyurethanes, polystyrene/butadiene rubbers, polyacrylonitrile/butadiene rubbers or copolymers thereof. As a process of binder finishing, a wet coagulation process, a dry coagulation process, or the like, is adopted, wherein the weight ratio of fiber to binder is adjusted so as to bring the feel, elasticity, or the like, into the preferred range of a man-made leather (leather-like article). A substrate of fiber aggregate alone will provide a soft feel, while it may have disadvantages, such as too little resiliency and difficulty in post-finishing during fabrication of secondary products. Therefore, a binder-finished substrate is generally preferred. The surface of the substrate may be as binder-finished, or relatively smoothed by slicing or sanding. One of the most preferred substrates for man-made leathers is manufactured by impregnating a nonwoven fabric of nylon staples with an N,N-dimethyl formamide solution of a polyurethane elastomer and then coagulating the solution, followed by washing with water and drying, and may be further subjected to a softener or water-repellent finish, if required.

As a release belt to be employed in the above-described process, a continuous belt is preferred. However, needless to say, it may be in the form of a cut-piece of sheet. A relatively inexpensive release paper finished with a releasing agent also may be used. However, as a material for endless belts which is endurable in continuous operation, stainless steel or a composite belt composed of a fiber- or glass fabric-reinforced high polymeric elastomer is preferred. As a high polymeric elastomer for the composite belt, polyfluoroethylene, NBR, SBR, an ethylene/propylene based diene rubber, a silicone based rubber, or the like, can be used. The release belts to be employed for providing the grain layer with a desired animal skin-like grain appearance are required, in any case, to be provided on their working surfaces, engraved or impressed, with an inverse pattern of the desired grain appearance. In addition, the materials for the release belt should not swell either in water or a water-miscible solvent solution of polyurethane elastomer, as will be described hereinafter, and are preferred to have an elasticity of a certain degree.

Further, a water-miscible solvent solution mainly comprising a polyurethane elastomer, which is coated onto the release belt, will be explained hereinafter. The polyurethane elastomer is a polymer comprising a polyol, an organic diisocyanate and a chain extender, which is highly polymerized mainly with urethane linkages. In this polymer, the main component may be combined with other polyesters in a small amount, for example, 5~30% by weight. As other polymers, various polymers are used according to the object. However, an essential condition for them is their solubility in the solvent which solubilizes the polymer mainly comprising a polyurethane. Inorganic or organic fillers, colorants or other additives may be further incorporated.

In the components constituting the polyurethane elastomer, the polyol is a compound having a molecular weight of about 500~3,000 and having hydroxyl groups mainly at both ends. There are a polyether type and a polyester type. The polyether type includes, for example, polypropylene glycol, polytetramethylene glycol, copolymers thereof and the like. The polyester type includes: polycondensation products of a low molecular glycol, such as ethylene glycol, 1,4-butylene glycol, 1,6-hexane glycol or the like, with a dicarboxylic acid, such as adipic acid, sebacic acid, isophthalic acid or the like; and polylactones, such as poly-$\epsilon$-caprolactone or the like. The organic isocyanate is an organic compound having two isocyanate groups, such as 2,4-tolylene diisocyanate, 4,4'-diphenylmethane diisocyanate, 1,6-hexane diisocyanate, isophorone diisocyanate, or the like. Further, the last component, the chain extender, is a compound having two active hydrogens, which is mainly a low molecular compound, for example: glycols, such as ethylene glycol, butylene glycol or the like; diamines, such as hydrazine, ethylene diamine, 1,2-propylene diamine, m-tolylene diamine or the like; and aminoalcohols.

Polymerization of polyurethane elastomers may be conducted by solution polymerization, bulk polymerization, solid-phase polymerization, or the like. However, solution polymerization carried out in a solvent, as will be described hereinafter, is preferred for the objects of the present invention, because it is a polymerization method that can control with high accuracy the viscosity, concentration, etc. of the solution for coating the belt.

A typical polyurethane elastomer to be preferably used among the above is composed of polybutylene adipate as a polyol, 4,4'-diphenyl diisocyanate as an organic diisocyanate and ethylene glycol as a chain extender. Additionally, it is one of the features of the polyurethane elastomers that the stiffness of the polyurethanes can be relatively flexibly controlled by controlling the molar ratio of polyol to organic diisocyanate.

There are various kinds of solvents for these polyurethane elastomers. Water-miscible solvents, inter alia, are required for the manufacture of the microporous grain layers according to the present invention. The water-miscible solvents include, for example, N,N-dimethyl formamide, N,N-dimethyl acetoamide, dimethyl sulfoxide, tetramethyl urea, N-methyl pyrrolidone or the like. Further, as a thinner to be admixed partly, dioxane, methylethyl ketone, tetrahydrofuran or the like, also can be used.

The polymer mainly comprising the above-mentioned polyurethane elastomer is dissolved into the above solvent at a polymer concentration of generally 15~40%, preferably 15~30%, more preferably 20~25%, by weight. Additionally, the viscosity of the solution lies in the range between 5,000 cps and 30,000 cps and depends upon the density of the substrate to be employed. One of the most preferably used solvents is N,N-dimethyl formamide that and is inexpensively available and a good solvent for polyurethane elastomers.

Coating of the above-described polyurethane elastomer solvent solution may be conducted by any conventional method and apparatus. The coating amount should be adequately adjusted to yield an average coat thickness after coagulation of 20~300 $\mu$m, preferably 20~200 $\mu$m, more preferably 20~100 $\mu$m, taking the polyurethane solids content into consideration. The substrate is subjected in advance to a moisturizing treatment by a pad-roll, spray, roll-applicator or the like. It is preferred that the substrate is moisturized to a water pickup or add-on percentage of 30~150% based on the weight of the substrate. If the water add-on percentage is lower than 30% by weight, the substrate substantially does not differ from a dry substrate so that when the substrate superimposing the polyurethane elastomer solution is heated from the topside of the substrate, the solvent rapidly evaporates to yield an undesirable nonporous grain layer with a stiff feel, as if the surface of the substrate were dry-finished with a polyurethane elastomer binder. Alternatively, if the water add-on percentage exceeds 150% by weight, free water partly appearing on the surface of the substrate instantly sets the polyurethane elastomer solution for the grain layer so that permeation of the polyurethane elastomer solution into the interstices of the fiber aggregate of the substrate is prevented thereby, resulting in a low grain layer peel strength of the product. When the water add-on percentage lies within the range between 30% and 150% by weight, the polyurethane elastomer solution adequately permeates into the interstices of the fiber aggregate of the substrate and the coagulation of the polyurethane elastomer solution smoothly proceeds from the topside to the substrate surface in contact with the belt, by the action of water vapor formed by heating, whereby a desired clear grain appearance or a flat and smooth appearance is set and a grain layer having a excellent suppleness and a high grain layer peel strength is formed.

The heating from the topside of the substrate may be conducted by making use of heat conduction or radiation. Namely, applicable means are to bring the topside surface of the moisturized substrate into contact with a heated body, expose the topside surface to hot air, irradiating heat rays, or the like. The heating temperature and time may generally be 50°~150° C. and about 0.1~10 minutes, respectively. Their appropriate conditions depend upon the thickness, density and water add-on percentage of the substrate, heating means, the amount of coated polyurethane elastomer solution, etc., in the ranges of 60°~90° C. and 1~2 minutes, respectively. If the temperature is too low, it will take too long for the elastomer to coagulate, so that it is not preferred from technical and economic points of view. Alternatively, if the temperature is too high, the coagulation cannot be controlled due to rapid evaporation of the water, so that formation of a satisfactory, microporous cell structure of the grain layer is not achievable.

By heating from the topside of the substrate under appropriate conditions, the solution mainly comprising a polyurethane elastomer begins to set up from the surface adjoining the substrate by the action of water vapor formed in the substrate and a well-controlled coagulating action gradually extends the other surface in contact with the belt. The thus resulting grain layer has micropores having a well-controlled average pore diameters gradient of from at least 4 μm, usually 5~10 μm, dispersed in the inner layer, to at most 3 μm in the vicinity of the free surface.

Further, it has been found that, in order to control the microporous cell structure (foamed structure) of such a grain layer to provide a high water vapor permeability as well as an excellent mechanical strength, such as abrasion resistance, flexing endurance or the like, incorporation of a solution mainly comprising a polyurethane elastomer with a surface active agent in an amount of 0.5~8%, preferably 1~4%, based on the weight of the polyurethane solids content, is very effective. As a surface active agent, any ionic, nonionic and ampholytic agent are applicable. When a hydrophilic surfactant (e.g. a nonionic surfactant having a high H.L.B. value) is added, the cell size readily increases. In contrast, when a hydrophobic surfactant (e.g. a nonionic surfactant having a low H.L.B. value) is added, the cell size readily decreases. According to this method, the average pore diameter of the grain layer can be controlled to at most 10 μm, irrespective of the composition, concentration, etc. of the polyurethane elastomer, to provide a high water vapor permeability as well as to improve mechanical strength, such as flexing endurance, abrasion resistance or the like. Heretofore, though surface active agents have been used in conventional wet regeneration processes, etc., they have not served to control the cell structure of the wet regenerated microporous grain layer, due to a large thickness of the layer. In contrast, the thin microporous grain layer according to the present invention, having a small thickness of at most 300 μm, preferably at most 200 μm, more preferably at most 100 μm, can be easily controlled by the surface active agents, resulting in a high water vapor permeability as well as a high mechanical strength, such as flexing endurance, abrasion resistance, or the like.

Then, at the stage where the polyurethane elastomer has substantially set up on the substrate, the resulting sheet material is released from the release belt and washed with water, followed by drying, to provide a leather-like material comprising a thin, microporous grain layer according to the present invention. At the stage of releasing, the microporous cell structure is completed, but still retains a large quantity of water-miscible solvent solution inside the structure. Therefore, substantially complete desolvation by sufficient washing with water is required like the conventional wet regeneration processes. If an insufficiently desolvated structure is dried, the microporous cell structure of the elastomer will redissolve to turn into a structure similar to a simple, dry-regenerated film which neither has a soft feel nor water vapor permeability.

When the release belt having an inverse pattern of a desired animal skin-like grain appearance is used, the microporous thin grain layer sets up with the desired grain appearance at the time of release from the inverse patterned release belt, in other words, the grain appearance is pre-patterned. Accordingly, it is fundamentally different from the conventional embossing at high temperatures with high pressures upon a flat and smooth surface of a previously prepared grain layer (i.e., the so-called, "post-grain patterning" or "post-embossing"). Namely, during post-embossing, the microporous grain layer collapses due to heat and pressure, so that the feel becomes stiff and the water vapor permeability is lowered. In contrast, the product of the present invention has got rid of any and all bad influences of post-embossing. This can be achieved only when the inverse patterned belt is applied as a release belt, whereby there is obtained a leather-like material comprising a grain layer having a stabilized, microporous cell structure extending throughout the layer thickness, together with a animal skin-like grain appearance set on the surface, without in the least impairing excellent suppleness and water vapor permeability. For example, a suede-like pattern is clearly transferred from an inverted patterned release belt to the grain layer, so that a useful leather-like material can be obtained only by further top-finishing with a color or clear coat.

FIG. 1 is a schematic side elevational view illustrating an embodiment of an apparatus to be used for conducting the above-described process.

In FIG. 1, a substrate 2 supported on a supply roll 1 is guided successively by guide rolls 3, 4, 5 to pass through a water bath 6 wherein the substrate is impregnated with water. Then, the substrate is squeezed by nip-rolls 7 to an appropriate dryness and further guided by guide rolls 8, 9 onto a rotary hot drum 10 that has a heating medium circulating inside. Meanwhile, a release belt 11 on a supply roll 12 is also guided by guide rolls 13, 14, 15 onto the rotary hot drum 10 and travels along the circumference of the hot drum contacting therewith. Further, the release belt is wound up on a take-up roll 18, via guide rolls 16, 17 of which at least one is a cooling roll. In the case where a durable release belt is employed, the supply roll 12 and take-up roll 18 may be replaced by guide rolls, respectively, as shown by the dotted line in FIG. 1, so that the belt can be mounted as an endless belt. The release belt, as described hereinabove, may be provided with an inversely engraved or impressed grain pattern on the surface. Before reaching the hot drum 10, the release belt is coated with a predetermined thickness of a solvent solution mainly comprising a polyurethane elastomer, by means of, for example, a doctor-coater 19 or the like. The topside of the moisturized substrate 2 having a superimposed polyurethane elastomer solution is heated as it travels by its contact with the hot drum 10. Setting of the polyurethane solution begins from its surface adjoining the substrate and completes to set a grain layer when the substrate leaves the hot drum. After passing the guide roll 17, a leather-like material 20 comprising a grain layer is peeled off from the release belt, chilled and delivered to the subsequent washing with water and drying processes.

The thus formed grain, 20~300 μm thick, preferably 20~200 μm thick, more preferably 20~100 μm thick, has numerous micropores dispersed and arranged therein, with an average pore diameter gradient in the direction of the thickness of from at least 4 μm in the inner layer to at most 3 μm in the vicinity of the topside surface. Furthermore, the grain layer has a stabilized cell structure extending throughout the thickness thereof, of which the innermost layer portion permeates partly and anchors into the interstices of the fiber aggregate and is bonded to the substrate, so that the leather-like material has excellent suppleness and water vapor permeability, together with a high mechanical strength, such as abrasion resistance, flexing endurance, or the like, and, furthermore, has a grain layer peel strength as large as at least 2 Kg/cm$^2$. FIG. 2 is a photomicrograph at 70× magnification of a cross-sectional view of an embodiment of a leather-like material according to the present invention. Further, FIG. 3 is also a photomicrograph at 600× magnification of a part of the grain layer shown in FIG. 2.

As seen in FIG. 2, the leather-like material according to the present invention has a grain layer of about 90 μm in average thickness formed on a substrate comprising a fiber skeleton. Alternatively, in FIG. 3, there are clearly observed the above-described anchoring and bonding structure of the grain layer to the substrate, the cell structure containing micropores gradient in average pore diameter, etc.

Further, conventional man-made leathers comprising a wet-regenerated grain layer show a high stiffness, so that even if a soft substrate having a low Gurley stiffness is combined, the product consisting of the soft substrate and stiff grain layer cannot but be considerably deteriorated in suppleness. However, in regard to the products according to the present invention, the extremely low stiffness of the grain layer itself does not materially deteriorate the suppleness of the whole article. A measure of this characteristic is the Gurley stiffness ratio of article to substrate, defined hereinbefore. As will be demonstrated in Examples to be described hereinafter, conventional man-made leathers exhibit a Gurley stiffness ratio of article to substrate of at least about 2, while the leather-like materials of the present invention exhibit at most, only 1.5, and in a preferred embodiment, at most 1.3. From the above fact, the excellent suppleness of the article of the invention can be sufficiently understood.

As described in detail hereinabove, one of the greatest advantages of the present invention is that leather-like materials comprising a thin, soft grain layer having a smooth or pre-patterned animal skin-like grain appearance and a water vapor permeability as excellent as that of a wet-processed microporous structure can be readily produced by a simple process. Particularly, it is surprising that a grain layer 30~50 μm thick that has heretofore been said to be impossible to produce by any processes other than the dry, release paper process, can be produced otherwise.

Further, even for polyurethane elastomers which are very difficult to desolvate according to conventional processes, for example, polyether or polycarbonate type, the process of coagulating by the action of saturated water vapor according to the present invention functions effectively, whereby the desolvation by washing with water proceeds very smoothly, so that leather-like materials having an excellent characteristics can be obtained.

Furthermore, it has not been expected that the incorporation of a small amount of surface active agent can improve water vapor permeability and provide a high mechanical strength, such as abrasion resistance, flexing endurance, or the like.

The leather-like materials according to the present invention have diversified applications, for example, as a shoe upper, bags, such as traveling cases, hand bags or the like, apparel, sporting goods, interior decoration, such as wall-coverings, upholstery, or the like, as a substitute for animal skin leathers.

The present invention will be further explained hereinafter by way of example. In the Examples, the parts and percentages are by weight.

Physical properties shown in the Examples were determined according to the following procedures:

(1) Grain layer peel strength

Two test swatches 25 mm wide and 150 mm long were cut out and the grain layers of both swatches were bonded face to face with an adhesive polyurethane elastomer solution. Using a tensile tester equipped with an automatic recorder, the bonded swatches were peeled off by 50 mm, with a clamp distance of 50 mm and a tension speed of 100 mm/min. The grain layer peel strength was expressed in an average to three significant digits from five measurements.

(2) Gurley stiffness

The Gurley stiffness was expressed in an average obtained from three measurements conducted in accordance with JIS L-1096.

(3) Abrasion resistance

The abrasion resistance was expressed in an average obtained from three measurements conducted in accordance with JIS L-1096, Taber Type Method. The testing apparatus prescribed in ASTM D-1175 (Rotary Method) was used.

(4) Flexing endurance

Measurement was conducted in accordance with JIS K-6545 at normal temperature with the number of flexing being 500,000. The criteria for judging the grade are as follows:

| | |
|---|---|
| Grade 1 . . . | Partly broken, or seriously cracked not to be usable. |
| Grade 2 . . . | Seriously cracked. |
| Grade 3 . . . | Considerably cracked. |
| Grade 4 . . . | Slightly cracked. |
| Grade 5 . . . | No cracks. |

(5) Surface appearance

The surface appearance was observed with the naked eye. Those that appeared as smooth as calfskin-tone were ranked as "good" and otherwise were ranked as "no good".

(6) Water vapor permeability

The water vapor permeability was determined in accordance with JIS K-6549. The higher the value, the higher the water vapor permeability.

EXAMPLE 1

A polyester fiber nonwoven fabric F was impregnated with a butylene adipate based, ester type polyurethane elastomer R, to prepare a substrate 1.30 mm thick, having a unit weight of 450 g/m$^2$, an apparent density of 0.35 g/cm$^3$ and a weight ratio of F/R of 60/40 (recesses and projections were observed more or less on the surface of the substrate, due to needle marks). Then, this substrate was moisturized with a pad-roll to a pick-up of 80%.

As a polyurethane elastomer for the grain layer, an N,N-dimethyl formamide solution of a 50/50 mixture of a butylene-based ester-type polyurethane and polytetramethylene ether-based ether-type polyurethane, in a concentration of 25% as solids content, was prepared. Further, this solution was colored with 0.5%, based on the weight of the polyurethane elastomer, of carbon black. The colored solution had a viscosity of 12,000 cps at 30° C.

The above polyurethane elastomer solution was coated, in an amount of 80 g/m², on a flat and smooth stainless steel belt finished with Teflon ® (polyfluoroethylene). Immediately thereafter, the above moisturized substrate was uniformly superimposed thereupon and heated for 4 minutes from above (the topside of the substrate) with an ultra-red ray heater. The topside surface of the moisturized substrate was heated to 70° C., when water vapor was dimply rising therefrom. Then, after contacting with the surface of a cooling roll to be cooled down to 40° C., the substrate provided with a grain layer was peeled off from the stainless steel belt and further washed with hot water at 60° C. for 90 minutes to be completely desolvated, followed by drying.

The thus obtained microporous grain layer was, on the average 50 μm thick, of which the portion adjoining the substrate permeated partially but deeply into the interstices of the fibers of the substrate and which topside surface looked as smooth as the surface of the stainless steel belt. Further, the resultant leather-like material embossed with a calfskin-tone grain pattern and then finished with black gravure ink according to a conventional process, looked just like a natural calfskin leather in respect of both the feel and appearance. Further, it had a peel strength of grain layer of 3.7 kg/cm.

COMPARATIVE EXAMPLE 1

For making a comparison, a grain layer was prepared exactly in the same manner as Example 1, except that a non-moisturized substrate was used. The obtained grain layer was fixed and dried on the surface of the substrate like a dry finished film and had a very stiff feel. The properties of the obtained article are shown in Table 1.

TABLE 1

| Example No. | Thickness (mm) | Density (g/cm³) | Appearance | Water vapor permeability (mg/cm · hr) | Gurley stiffness (mg) |
| --- | --- | --- | --- | --- | --- |
| 1 | 1.31 | 0.36 | Very smooth | 8.1 | 820 |
| Comparative Example 1 | 1.29 | 0.37 | recesses and projections observed | 0.4 | 1,580 |

EXAMPLES 2~5 AND COMPARATIVE EXAMPLES 2~4

Seven kinds of black color finished leather-like materials were produced in exactly the same manner as Example 1, except that the pick-up rate of water of the moisturized substrate varied as shown in Table 2.

The water pick-up is an important factor in order to achieve the present invention. Leather-like materials comprising a grain layer having stabilized properties and appearance were obtained when the pick-up rate was within the range between 30% and 150% (Examples 2~5). In contrast, when the pick-up rate was less than 30%, i.e., 24% (Comparative Example 2,) wherein the substrate was close to the dry condition, the feel was stiff and the appearance was ripply like a dry regenerated grain layer. The resultant leather-like material was poor in water vapor permeability. On the other hand, when the pick-up rate was more than 150%, i.e., 165% (Comparative Example 3) and 200% (Comparative Example 4), an excess of free water contained in the substrate instantly coagulated the polyurethane solution for grain layer on the surface of the substrate immediately after superimposing, yielding an unsatisfactory product as a leather-like material, having a grain layer not clearing the passing mark for a peel strength but clearing the smoothness of the surface.

TABLE 2

| Example No. | Degree of moisturization [Add-on rate] (%) | Thickness (mm) | Density (g/cm³) | Water vapor permeability (mg/cm · hr) | Gurley stiffness (mg) | Grain layer peel strength (kg/cm) |
| --- | --- | --- | --- | --- | --- | --- |
| Comparative Example 2 | 24 | 1.29 | 0.37 | 2.6 | 1420 | 4.2 |
| 2 | 30 | 1.30 | 0.37 | 7.1 | 980 | 4.1 |
| 3 | 50 | 1.31 | 0.36 | 9.0 | 890 | 3.9 |
| 4 | 110 | 1.32 | 0.36 | 9.3 | 860 | 3.1 |
| 5 | 150 | 1.32 | 0.36 | 10.4 | 860 | 2.8 |
| Comparative Example 3 | 165 | 1.33 | 0.35 | 10.8 | 830 | 1.4 |
| Comparative Example 4 | 200 | 1.33 | 0.35 | 11.2 | 810 | 0.8 |

EXAMPLE 6~8

A release belt 1.0 mm thick having a flat and smooth surface was prepared from a fiber glass fabric reinforced silicone sheet. A black-colored leather-like material was manufactured exactly in the same manner as Example 1, except that the release belt was coated with the polyurethane solution for grain layer in amounts of 40, 100 and 300 g/m² (Examples 6, 7 and 8, respectively). As shown in Table 3 below, the leather-like materials of Examples 6 8 had satisfactory suppleness and appearance.

TABLE 3

| Example No. | Coating amount (g/m²) | Gross thickness (mm) | Thickness of grain layer (μm) | Water vapor permeability (mg/cm · hr) | Gurley stiffness (mg) | Grain layer peel strength (kg/cm) |
| --- | --- | --- | --- | --- | --- | --- |
| 6 | 40 | 1.30 | 15 | 12.0 | 790 | 3.8 |
| 7 | 100 | 1.34 | 60 | 8.3 | 850 | 3.8 |
| 8 | 300 | 1.46 | 180 | 6.7 | 960 | 3.5 |

EXAMPLE 9

A brown, dyed woven fabric 0.9 mm thick, consisting of a polyester/rayon=65/35 blend-spun yarn, having a raised surface and a unit weight of 200 g/m² was moisturized with a pad-roll to a water pick-up of 90%.

Meanwhile, a polyurethane elastomer prepared by polymerization of a mixture of polytetramethylene ether glycol (molecular weight of 1,500), 4,4'-diphenylmethane diisocyanate and ethylene glycol, in a molar ratio of 1:4:3, was dissolved in N,N-dimethyl formamide at a concentration as solids of 28%, to prepare a polyurethane elastomer solution for the grain layer having a viscosity of 21,000 cps at 30° C. This solution was further colored with a brown pigment.

Then, the silicone sheet belt used in Example 6 was coated with the above polyurethane elastomer solution in an amount of 100 g/m² and immediately thereafter, the above moisturized woven fabric was uniformly superimposed thereupon. In this case, the fabric was superimposed so that the unraised surface may be grain-finished. The raised surface of the fabric superimposed on the silicone sheet was contacted for 3 minutes with the surface of an iron plate having a surface temperature of 95° C. for heat-treating. Then, the fabric supporting the grain layer was peeled off from the silicone sheet and introduced into water at 60° C. to be washed thoroughly, followed by drying.

A grain layer having excellent surface smoothness of the resulting leather-like material was embossed with a kidskin-tone grain pattern, colored with a gravure ink and then top-finished in a dull-tone with a clear coat. The obtained leather-like material had a gross thickness of 0.94 mm and had on excellent suppleness and smoothness and exhibited a water vapor permeability of 11.3 mg/cm²·hr. This material was very useful for ladies' shoes.

EXAMPLE 10

A polyester fiber nonwoven fabric F was impregnated with a butylene adipate-based, ester-type polyurethane elastomer R, to prepare a substrate 1.30 mm thick, having a unit weight of 470 g/m², an apparent density of 0.35 g/cm³ and a weight ratio of F/R of 60/40 (recesses and projections were observed more or less on the surface of the substrate, due to needle marks). The Gurley stiffness of the substrate was determined to be 560 mg. Then, this substrate was moisturized with a pad-roll to a water pick-up of 80%.

As a polyurethane elastomer for the grain layer, an N,N-dimethyl formamide solution of a 50/50 mixture of a butylene-based ester-type polyurethane and polytetramethylene ether-based ether-type polyurethane, in a concentration of 25% as solids, was prepared. Further, this solution was colored with 0.5%, based on the weight of the polyurethane elastomer, of carbon black. The colored solution had a viscosity of 12,000 cps at 30° C.

The above polyurethane elastomer solution was coated, in an amount of 100 g/m², on a stainless steel belt engraved with an inverse pattern of a kidskin-tone grain appearance and coated thinly with polyfluoroethylene. Immediately thereafter, the above moisturized substrate was uniformly superimposed thereupon and heated for 4 minutes from above (the topside of the substrate) with an ultra-red ray heater. The topside surface of the moisturized substrate was heated to 70° C., when water vapor was dimply rising therefrom. Then, after contacting with the surface of a cooling roll to be cooled down to 40° C., the substrate provided with a grain layer was peeled off of the inverse grain patterned, stainless steel belt and further washed with hot water at 60° C. for 90 minutes to be completely desolvated, followed by drying.

The thus obtained microporous grain layer was, on the average 50 μm thick, of which the portion adjoining the substrate permeated partially but deeply into the interstices of the fibers of the substrate and on which topside surface, a kidskin-tone grain appearance having beautiful effects of light and shade was set. A leather-like material further finished with black gravure ink according to a conventional process, looked just like a kidskin in respect of both feel and appearance. Further, it had a peel strength of 3.8 kg/cm and a Gurley stiffness of 630 mg. Thus, it was supple and of satisfactory quality. The Gurley stiffness ratio of article to substrate was 1.13.

COMPARATIVE EXAMPLE 5

For making a comparison, a grain layer was prepared exactly in the same manner as Example 10, except that a flat and smooth stainless steel release belt was used instead of the grain-patterned release belt. Thereafter, embossing was conducted, at a pressure of 30 kg/cm² and a running speed of 3 m/min., with an emboss roll engraved with a kidskin-like grain, having a surface temperature of 160° C. The further gravure-finished embossed material had a thickness decreased to 30 μm due to collapse, resulting in a stiff feel.

COMPARATIVE EXAMPLE 6

For a further comparison, a grain layer was prepared exactly in the same manner as Example 10, except that a non-moisturized substrate was used. The obtained grain layer was fixed on the surface of the substrate and had a very stiff feel. The properties of the obtained articles are shown in Table 4.

TABLE 4

| Example No. | Gross thickness (mm) | Apparent Density (g/ml) | Appearance | Water vapor permeability (mg/cm$^2$ · hr) | Gurley stiffness (mg) | Article/substrate Gurley stiffness ratio |
| --- | --- | --- | --- | --- | --- | --- |
| Substrate | — | — | — | — | 560 | — |
| Example 10 | 1.32 | 0.36 | Clear grain | 7.8 | 630 | 1.13 |
| Comparative Example 5 | 1.22 | 0.41 | Hard surface | 4.1 | 1090 | 1.95 |
| Comparative Example 6 | 1.29 | 0.39 | Recesses and projections observed | 0.1 | 1630 | 2.90 |

EXAMPLES 11~14

In order to exactly reproduce a grain appearance of goatskin, a release belt 1.5 mm thick was prepared from a silicone sheet cast with a curable silicone solution and engraved with an inverse pattern of a goatskin-tone grain appearance. A black-colored leather-like material was manufactured exactly in the same manner as Example 1, except that the release belt was coated with the polyurethane solution for grain layer in amounts of 50, 150, 300 and 400 g/m$^2$ (Examples 11, 12, 13 and 14, respectively). As shown in Table 5 below, the leather-like materials of Examples 11~13 had satisfactory suppleness and goatskin-like appearance.

COMPARATIVE EXAMPLE 7

A black-colored leather-like material was manufactured in the same manner as Example 10, except that the coating amount was 500 g/m$^2$. This polyurethane solution was heated at 70° C. for 10 minutes in order to set sufficiently. However, the average thickness of the grain layer on the substrate reached no less than 340 μm. Further, balanced coagulation by the action of water vapor did not proceed satisfactorily, so that the Gurley stiffness was 1,400 mg and the goatskin-like grain appearance was not clear.

cosity of 21,000 cps at 30° C. This solution was further colored with a brown pigment.

Then, the goatskin-like grain inversely patterned silicone sheet used in Example 11 was coated with the above polyurethane elastomer solution in an amount of 100 g/cm$^2$ and, immediately thereafter, the above moisturized woven fabric was uniformly superimposed thereupon. In this case, the fabric was so superimposed that the unraised surface may be grain-finished. The raised surface of the fabric superimposed on the silicone sheet was contacted for 3 minutes with the surface of an iron plate having a surface temperature of 95° C. for heat-treating. Then, the fabric supporting the grain layer was peeled off from the silicone sheet and introduced into water at 60° C. to be washed thoroughly, followed by drying.

A leather-like material obtained by top-finishing the above goatskin-like grain with a clear coat had a gross thickness of 1.05 mm and a soft, non-collapsed grain layer having fine effects of light and shade. This material exhibited a water vapor permeability of 12.8 mg/cm$^2$·hr and a Gurley stiffness of 230 mg. Accordingly, its Gurley stiffness ratio of article to substrate was 1.21. This material was very useful for ladies' shoes.

EXAMPLE 16

TABLE 5

| Example No. | Coating amount (g/m$^2$) | Gross thickness (mm) | Thickness of grain layer (μm) | Water vapor permeability (mg/cm$^2$ · hr) | Gurley stiffness (mg) | Article/substrate Gurley stiffness radio | Apperance pattern |
| --- | --- | --- | --- | --- | --- | --- | --- |
| 11 | 50 | 1.31 | 25 | 9.3 | 600 | 1.07 | Clear |
| 12 | 150 | 1.37 | 90 | 7.1 | 670 | 1.19 | Clear |
| 13 | 300 | 1.47 | 190 | 6.5 | 780 | 1.39 | Clear |
| 14 | 400 | 1.53 | 265 | 5.2 | 1050 | 1.87 | Slightly unclear |
| Comparative Example 7 | 500 | — | 340 | — | 1400 | 2.50 | Unclear |

Remark: FIGS. 2 and 3 are photomicrographs of the cross-sectional views of the leather-like material obtained by Example 12.

EXAMPLE 15

A brown dyed woven fabric 0.9 mm thick, consisting of a polyester/rayon 65/35 blend-spun yarn, having a raised surface and a unit weight of 200 g/m$^2$ was moisturized with a pad-roll to a water pick-up of 90%. The Gurley stiffness of this fabric was 190 mg.

Meanwhile, a polyurethane elastomer prepared by polymerization of a mixture of polyteramethylene glycol (molecular weight of 1,500), 4,4-diphenylmethane diisocyanate and ethylene glycol, in a molar ratio of 1:4:3, was dissolved in N,N-dimethyl formamide at a concentration as solids of 28%, to prepare a polyurethane elastomer solution for a grain layer having a vis- A polyester staple nonwoven fabric F was impregnated with a butylene adipate based, ester-type polyurethane elastomer R, to prepare a substrate 1.30 mm thick, having a unit weight of 470 g/m$^2$, an apparent density of 0.36 g/cm$^3$ and a weight ratio of F/R of 60/40. The Gurley stiffness of the substrate was determined to be 560 mg. On the surface of this substrate, recesses and projections were observed more or less, due to needle marks. Then, this substrate was moisturized with a pad-roll to a water pick-up of 80%.

As a polyurethane elastomer for grain layer, an N,N-dimethyl formamide solution of a 50/50 mixture of butylene-based ester-type polyurethane and polytetramethylene ether-based ether-type polyurethane, in a concentration as solids content of 25%, was prepared. Further, this solution was colored with 0.5% carbon black and combined with a 2.0% surface active agent, in particular, sodium octylsulfosuccinate, an anionic surfactant manufactured by Kao-Atlas Corp., based on the weight of the polyurethane elastomer. This water-miscible solvent solution mainly comprising the polyurethane elastomer had a viscosity of 12,000 cps at 30° C.

The above water-miscible solvent solution was casted, in an amount of 100 g/m², on a stainless steel belt engraved with an inverse pattern of a grain appearance and further coated thinly with polyfluoroethylene. Immediately thereafter, the above moisturized substrate was uniformly superimposed thereupon and heated for 4 minutes from above (the topside of the substrate) with an ultra-red ray heater. The topside surface of the moisturized substrate was heated to 70° C., when water vapor was dimply rising therefrom. Then, after contact with the surface of a cooling roll to be cooled down to 40° C., the substrate provided with a grain layer was peeled off from the release belt and further washed with hot water at 60° C. for 90 minutes to completely desolvate, followed by drying.

The thus obtained microporous grain layer was, on the average 50 μm thick, on which topside surface a beautiful grain appearance was set. A leather-like material having been further finished with black gravure ink, according to a conventional process, looked just like an animal skin leather in respect of both feel and appearance. Further, it had a grain layer peel strength of 3.8 kg/cm and a Gurley stiffness of 630 mg. Thus, it was supple and of satisfactory quality. The Gurley stiffness ratio of article to substrate was 1.13. Further, the water vapor permeability and mechanical strength, such as abrasion resistance, flexing endurance, or the like, are shown in Table 6 and FIG. 4.

EXAMPLES 17~23

The whole process was conducted exactly in the same manner as Example 16, except that the amount of the surface active agent was varied to 0%, 1%, 3%, 4%, 6%, 8% and 10% (Examples 17~23, respectively). The physical properties of the products are also shown in Table 6 and FIG. 4. It is seen from FIG. 4 that the surface active agent should be added in an amount lying in the proper range between 0.5% and 8%, preferably between 1% and 4%, in order to provide a good abrasion resistance as well as maintaining an adequate water vapor permeability.

TABLE 6

| Example No. | Amount of surfactant (wt %) | Water vapor permeability (mg/cm²·hr) | Abrasion resistance (%) | Flexing endurance (grade) | Appearance |
| --- | --- | --- | --- | --- | --- |
| 17 | 0 | 7.8 | 8.1 | 3 | Good |
| 18 | 1 | 8.1 | 4.0 | 5 | Good |
| 16 | 2 | 8.4 | 3.6 | 5 | Good |
| 19 | 3 | 8.2 | 3.5 | 5 | Good |
| 20 | 4 | 7.8 | 3.4 | 5 | Good |
| 21 | 6 | 6.5 | 3.3 | 5 | Good |
| 22 | 8 | 5.2 | 3.2 | 5 | Good |
| 23 | 10 | 3.3 | 3.1 | 4 | Good |

EXAMPLE 24

A thin man-made leather was obtained exactly in the same manner as Example 16, except that a nonionic surfactant consisting of polypropylene glycol of 3,000 molecular weight and polyethylene glycol of 500 molecular weight was used in an amount of 2.5%, instead of sodium dioctyl sulfosuccinate. The obtained leather-like material had a grain layer peel strength of 3.7 kg/cm², a Gurley stiffness of 640 mg, a Gurley stiffness ratio of article to substrate of 1.15, a water vapor permeability of 7.9 mg/cm²·hr, a flexing endurance of grade 5 and a good appearance.

EXAMPLES 25~29

Leather-like materials were obtained in the same manner as Example 16, except that the polyurethane elastomer water-miscible solvent solution was cast in amounts of 60, 200, 350, 500, 650 g/m² (Examples 25, 26, 27, 28 and 29, respectively). The physical properties of each product, as shown in Table 7, exhibited good values with respect to surface appearance, water vapor permeability, abrasion resistance and flexing endurance, when the grain layer was 200 μm thick or less.

TABLE 7

| Example No. | Cast amount (g/m²) | Thickness of grain layer (μm) | Water vapor permeability (mg/cm²·hr) | Abrasion resistance (%) | Flexing endurance (grade) | Appearance |
| --- | --- | --- | --- | --- | --- | --- |
| 25 | 60 | 20 | 8.5 | 4.8 | 5 | Good |
| 26 | 200 | 80 | 7.5 | 3.7 | 5 | Good |
| 27 | 350 | 135 | 6.3 | 3.5 | 5 | Good |
| 28 | 500 | 190 | 5.5 | 3.6 | 5 | Good |
| 29 | 650 | 240 | 4.1 | 3.5 | 5 | No good |

EXAMPLE 30

A leather-like material was manufactured exactly in the same manner as Example 16, except that a woven fabric 0.9 mm thick, consisting of a polyester/rayon 65/35 blend-spun yarn, having a raised surface, a unit weight of 200 g/m² and a Gurley stiffness of 190 mg and having been moisturized to a water add-on amount of 90% was used instead of the non-woven fabric substrate. The obtained leather-like material was very soft, having a Gurley stiffness of 245 mg and a Gurley stiffness ratio of article to substrate of 1.29. Further, it also exhibited a good mechanical strength and, particularly, a water vapor permeability of 13.2 mg/cm²·hr.

What is claimed is:

1. A process for manufacturing an imitation leather material product comprising the steps of: applying a coating of a water-miscible solvent solution onto a release belt, said solvent solution containing a polyurethane elastomer; superimposing a water-moisturized substrate onto said coating; applying heat to an upper surface of said water-moisturized substrate by means disposed above to cause the formation of water vapor therein; coagulating said polyurethane elastomer by said water vapor to cause said polyurethane elastomer to bond to said substrate and form a resultant imitation leather material; removing said resultant imitation leather material from said release belt; washing said resultant imitation leather material to remove any remaining solvent therefrom; and drying said resultant imitation leather material to yield said imitation leather material product.

2. The process according to claim 1, wherein the release belt has an inverse pattern of a desired animal skin-like grain appearance.

3. The process according to claim 1, wherein the release belt has a flat and smooth surface.

4. The process according to claim 1, wherein the water-miscible solvent solution contains a surface active agent in an amount of 0.5~8% based on the weight of the polyurethane solids content.

5. A process for manufacturing an imitation leather material product comprising the steps of: applying a coating of a water-miscible solvent solution onto a release belt, said solvent solution containing a polyurethane elastomer; superimposing a water-moisturized substrate onto said coating, said water-moisturized substrate having a water add-on amount of 30-150% based on the weight of the substrate; applying heat to an upper surface of said water-moisturized substrate by means disposed above it to cause the formation of water vapor therein; coagulating said polyurethane elastomer by said water vapor to cause said polyurethane elastomer to bond to said substrate and form a resultant imitation leather material; removing said resultant imitation leather material from said release belt; washing said resultant imitation leather material to remove any remaining solvent therefrom; and drying said resultant imitation leather material to yield said imitation leather material product.

6. The process according to claim 5, wherein the water-moisturized substrate has a water add-on amount of 50~120%, based on the weight of the substrate.

* * * * *

UNITED STATES PATENT AND TRADEMARK OFFICE
CERTIFICATE OF CORRECTION

PATENT NO. : 5 151 240
DATED : September 29, 1992
INVENTOR(S) : Koin ASANO et al It is certified that error appears in the above-identified patent and that said Letters Patent is hereby corrected as shown below:

On the title page, in the ABSTRACT, line 1; change "feed" to ---feel---.

Signed and Sealed this

Eighth Day of February, 1994

*Attest:*

BRUCE LEHMAN

*Attesting Officer*  *Commissioner of Patents and Trademarks*